Feb. 1, 1949.  W. E. LYONS  2,460,700
METHOD OF OPERATING AN INTERNAL-COMBUSTION ENGINE
Filed July 1, 1947
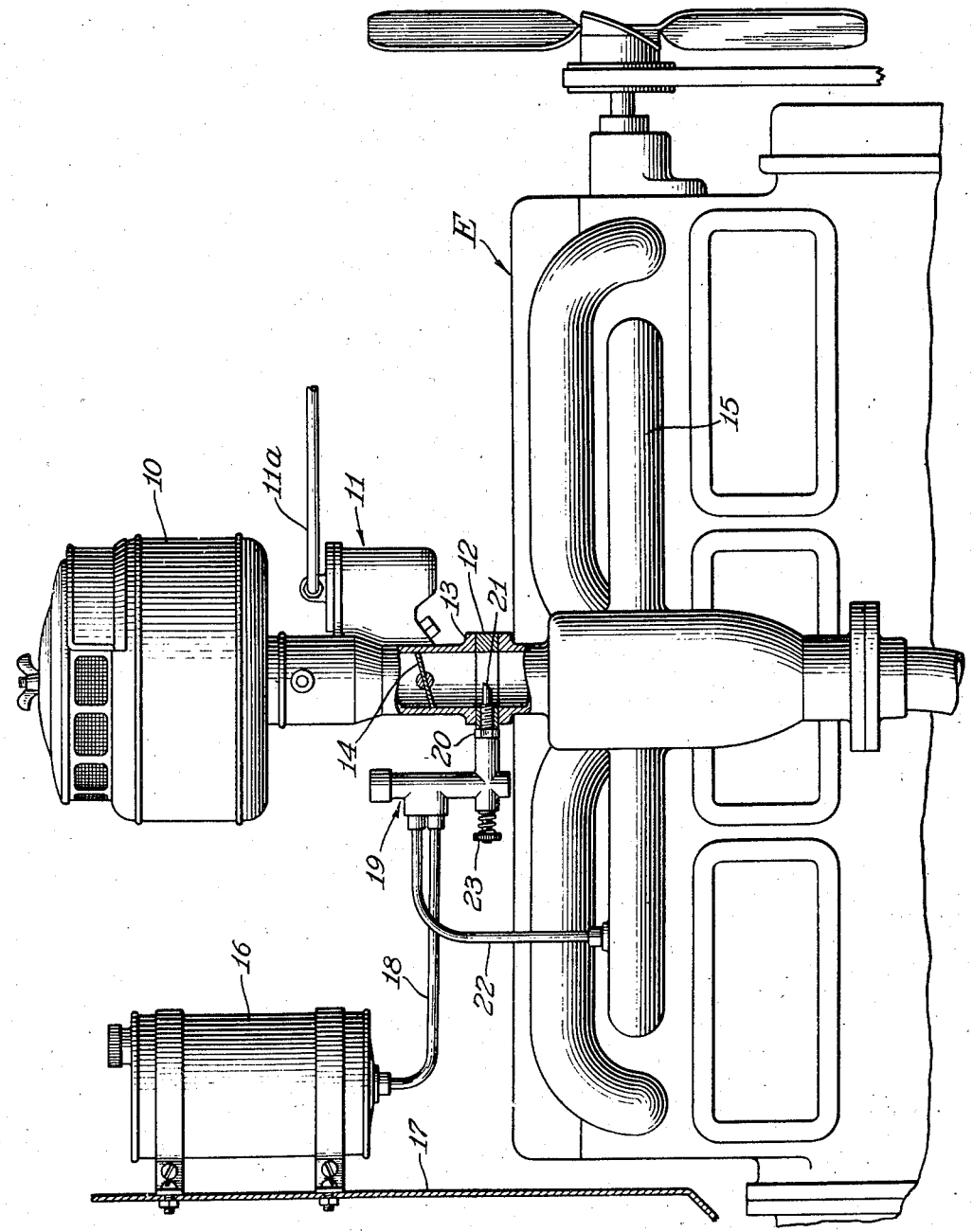
Inventor
John T. Dempsey, Adm'r of the Estate of Willard E. Lyons
Deceased
by The Firm of Charles W. Hills   Attys Patented Feb. 1, 1949

2,460,700

UNITED STATES PATENT OFFICE 2,460,700

METHOD OF OPERATING AN INTERNAL-COMBUSTION ENGINE

Willard E. Lyons, deceased, late of Chicago, Ill., by John T. Dempsey, administrator, Chicago, Ill., assignor to Leo Corporation, Chicago, Ill., a corporation of Illinois Application July 1, 1947, Serial No. 758,469

11 Claims. (Cl. 123—1)

This invention relates to a method of operating internal combustion engines, and more particularly to a method of improving combustion by creating and maintaining combustion-improving catalytic deposits in the combustion chamber of an internal combustion engine by introducing into the combustion chamber during the operation of the engine an internal coolant liquid containing a small but effective quantity of one or more compounds of catalytic metals.

In the patents to Lyons and McKone, U. S. Patents Nos. 2,086,775 and 2,151,432, owned by the same assignee as the present application, methods are described for improving the combustion efficiency of internal combustion engines by introducing into the combustion chamber a fuel charge containing a relatively small concentration of an organo-metallic compound, the concentration being so small as to have in itself no improving effect upon the combustion of the fuel except as it results in the formation of a catalytic deposit within the combustion chamber and such deposit becomes effective by augmentation during continued operation of the engine to increase the efficiency of combustion within said engine. The patented method thus contemplates the introduction of compounds of catalytic metals into the combustion chamber by the dissolution of such compounds in the fuel itself. Such practice is effective but it involves the disadvantage that it is limited to the use of oil soluble metallic compounds, whereas many less expensive but equally effective types of metal compounds are not oil soluble. The present invention makes it possible to utilize such oil-insoluble catalytic metal compounds.

One disadvantage inherent in the use of fuel solutions of catalytic metal compounds arises because of the nature of the usual fuel induction system, including, as it does, a carburetor, an intake manifold, and/or a supercharger. In such a system, a substantial proportion of the concentration of fuel-soluble metallic compounds is liable to precipitate out somewhere in the system ahead of the engine, due possibly to partial decomposition and/or oxidation, with the formation of a deposit that adheres to and remains on the wall surfaces of the induction system and supercharger impeller vanes, if a supercharger is used. There is thus caused a loss of effective catalysts. This loss cannot be overcome by increasing the concentration of the catalytic metal compounds in the fuel without also substantially increasing the cost of operations, and, furthermore, increased concentrations result in excessive deposits of the catalysts in the induction system.

It is therefore an important object of this invention to provide an improved medium and method for introducing oil-insoluble compounds of catalytic metals into the combustion chamber of an internal combustion engine to improve the combustion efficiency thereof.

As the medium for introducing catalytic metal compounds, water, a water soluble alcohol, a water soluble glycol, or mixtures thereof, or other aqueous type internal coolant liquids may be used. The term "aqueous type," as used herein and in the claims is intended to include water, and water soluble alcohols and glycols since all of these have in common an OH group and are miscible with each other. The catalytic metal compounds are dissolved in the particular internal coolant liquid selected and are introduced in solution form into the combustion chamber simultaneously with introduction of the operating fuel charge. The benefits of internal coolant liquids and means for metering and introducing them into engine combustion chambers are known and available. By utilizing this medium for the introduction of the dissolved catalytic metal compounds into the combustion chamber the disadvantages and limitations encountered when such compounds are dissolved in the operating fuel are avoided. In addition, it is possible to use inexpensive and more effective forms of metallic compounds where solubility in an aqueous type of liquid is the limiting factor instead of solubility in oil or gasoline.

Furthermore, by utilizing the principles of this invention the scope of usefulness of water, alcohol or other aqueous type liquid coolant injection is thereby greatly extended. In the past, the induction of an internal coolant liquid has been more or less limited to those periods of operation of the engine when the engine is operating under full load condition, since no commensurate advantage is obtained during periods of light load operations in the cruising range. Internal coolant liquids embodying my present invention, however, are intended for continuous use in the operation of an internal combustion engine, since it is desirable continuously to supply minute concentrations of the catalytic metal compound to the combustion chamber in order to maintain and replenish the deposits of the catalysts on the surfaces within the chamber. This phase of my present invention also enhances the value of such internal coolant injection systems by enabling the system to perform additional anti-knock or combustion-improving functions that the internal coolant liquid alone, as heretofore used, has not been capable of performing. Thus, there may be used a relatively low octane number fuel, susceptible to a more rapid rate of combustion in a lean air-fuel mixture for cruising loads, and its octane value deficiencies can be compensated for during heavy load operations by the introduction of larger concentrations of the catalytic metal compounds dissolved in the injected water, alcohol, or other coolant liquid. Conversely, if the octane number of the operating fuel is sufficient to meet the octane requirements of heavy load operations, the combustion characteristics of lean fuel mixtures during light load operations can be improved by the proper selection and use of combustion-accelerant catalytic metal compounds introduced in minute amounts in the liquid coolant and injected during the periods of light load or cruising operations. Such introduction of coolant liquid containing catalytic metal compounds serves to provide catalytic residues that replenish and maintain the catalytic deposits on the surfaces within the combustion chamber, and also serves to provide suspended particles of catalytic metal compounds that function to improve the combustion of the fuel charge.

It is therefore an important object of this invention to provide a method for enhancing the combustion efficiency of internal combustion engines by introducing into said combustion chambers, along with the fuel charge, an internal coolant liquid containing dissolved catalytic metal compounds capable while suspended in the air-fuel mixture in the combustion chambers of improving the combustion of said mixture, and capable of providing catalytic residues for replenishing and maintaining catalytic deposits on the surfaces of the combustion chambers for likewise improving the combustion characteristics of the fuel.

It is a further important object of this invention to provide an internal coolant liquid containing small but effective quantities of dissolved catalytic metal compounds for introduction into internal combustion engines for improving the combustion characteristics thereof.

Other and further important objects of this invention will become apparent from the following description and appended claims.

On the drawing:

The single figure of the drawing is a fragmentary, schematic elevational view, with parts broken away, of an internal combustion engine and fuel intake assembly equipped with means for supplying internal coolant liquid to the intake manifold of the engine in accordance with the method of the present invention.

As shown on the drawings:

Reference character E refers generally to a high compression internal combustion engine equipped with the customary air and fuel charging assembly including an air cleaner 10, a carburetor 11 receiving air from the cleaner 10, for mixture with a main hydrocarbon fuel introduced through a fuel line 11a for subsequent introduction into the engine E. A mounting block 12 is interposed in the inlet 13 between the inlet butterfly valve 14 and the intake manifold 15. An atomized fuel and air mixture from the carburetor 11 passes through the mounting block 12 into the intake manifold 15 to the cylinders of the engine E.

A relatively small tank 16 for internal coolant liquid is mounted on the firewall 17 of the engine E. An internal coolant liquid such as hereinbefore described is fed from the tank 16 through a feed line 18 through a metering valve 19 which injects the liquid into the main fuel stream passing through the block 12 in controlled, metered amounts. The valve 19 is mounted on the block 12 as by nut 20 and is connected to a nozzle 21 projecting into the fuel stream passing through the block 12. The metering valve 19 is vented to manifold pressure by means of a line 22 secured to the manifold 15 and to the valve 19.

The valve 19 is divided into two separate, internal chambers, one chamber being connected to the tank 16 through line 18 and to the nozzle 21, while the other chamber is vented to the manifold pressure through line 22. The chambers may be connected by suitable pressure sensitive means, such as a diaphragm, or spring-urged valve, so that the amount of liquid injected into the fuel stream through the nozzle 21 is determined by the manifold pressure of the engine E. A restricted orifice (not shown) is provided in the lower portion of the metering valve 19 and the size of the orifice aperture and the relative amount of liquid injected into the fuel stream is controlled by a spring urged needle valve 23.

It should be understood that, by means of the metering valve 19, internal coolant liquid may be injected into the fuel stream at a rate which may be regulated in accordance with the changes in manifold pressure brought about by the operating conditions under which the engine E is functioning. For example, when the engine is operating at high speeds or under high loads, it is desirable to introduce more internal coolant liquid together with a larger amount of required hydrocarbon fuel. It may be desirable to introduce the internal coolant liquid only during those periods of operation during which the engine is operating at high speed or under a heavy load. Accordingly, the valve 19 may be employed to completely shut off the flow of internal coolant liquid during periods of normal operation or during idling of the engine E. By means of the needle valve 23 for controlling the size of the restricted orifice of the metering valve 19, it may be possible to effect these variations in the feeding rate.

The feeding system as illustrated in the drawing is thus flexible and may be employed in a manner best suited for the particular operating conditions under which the engine E is to be operated.

In accordance with the present invention, catalytic metal compounds are dissolved or dispersed in an internal coolant liquid and the solution or dispersion so formed is then introduced into the combustion chamber of an internal combustion engine in the manner and for the purposes herein described. Compounds of the following metals have been found to be useful as major catalysts or as promoter catalysts in the compositions of the present invention:

| | | |
|---|---|---|
| cobalt | thorium | boron |
| nickel | chromium | cesium |
| manganese | aluminum | potassium |
| iron | selenium | sodium |
| copper | antimony | tantalum |
| uranium | arsenic | titanium |
| molybdenum | bismuth | tungsten |
| vanadium | cadmium | zinc |
| zirconium | tellurium | cerium |
| beryllium | thallium | praseodymium |
| platinum | tin | neodymium |
| palladium | barium | lanthanum |

For maximum improvement of the power output, operation and efficiency of combustion of the fuel of an internal combustion engine, it is preferable to select the catalytic metal compound from compounds of the group of metals comprising cobalt, chromium, cerium, nickel, copper, manganese, iron, vanadium, aluminum, zirconium, zinc and boron. Inorganic compounds of these metals that are soluble in water or alcohol, as for example, the nitrates, chlorides, or acetates, are preferred. In some instances, compounds containing two or more metals of the group may be used, such as zinc permanganate. In some instances, the oxide, acid or acid anhydride of the metal may be employed, as for instance in the case of chromic oxide ($CrO_3$), boric acid ($HBO_3$) and vanadium pentoxide ($V_2O_5$). The internal coolant liquid in which these compounds may be dissolved may be water, a water soluble alcohol, or a water soluble glycol, or aqueous solutions of alcohols or glycols. A typical liquid vehicle is a mixture of water and a water soluble monohydric alcohol, such as methyl, ethyl or iso-propyl alcohol, in the proportion of from 20 to 80% of alcohol, and preferably about 50% of alcohol.

The following are examples of internal coolant liquid compositions comprising solutions of compounds of metals selected from the preferred group given above. The coolant liquid in these examples may be water, and alcohol such as ethyl alcohol, a water soluble glycol such as ethylene glycol, or aqueous solutions of an alcohol or a water soluble glycol. Parts are expressed as parts by weight.

Example 1

| | Parts | |
|---|---|---|
| Coolant liquid | 98.00 | 99.50 |
| Cobalt nitrate | 1.60 | 0.40 |
| Chromium triozide | 0.40 | 0.10 |
| | 100.00 | 100.00 |

Example 2

| | Parts | |
|---|---|---|
| Coolant liquid | 98.00 | 99.50 |
| Manganese nitrate | 1.50 | 0.30 |
| Nickel acetate | 0.50 | 0.20 |
| | 100.00 | 100.00 |

Example 3

| | Parts | |
|---|---|---|
| Coolant liquid | 98.00 | 99.50 |
| Cupric nitrate | 1.60 | 0.40 |
| Cerous nitrate | 0.40 | 0.10 |
| | 100.00 | 100.00 |

Example 4

| | Parts | |
|---|---|---|
| Coolant liquid | 98.00 | 99.50 |
| Ferrous acetate | 1.60 | 0.40 |
| Vanadium pentoxide | 0.40 | 0.10 |
| | 100.00 | 100.00 |

Example 5

| | Parts | |
|---|---|---|
| Coolant liquid | 98.00 | 99.50 |
| Aluminum nitrate | 0.80 | 0.20 |
| Chromium nitrate | 0.80 | 0.20 |
| Boracic acid | 0.40 | 0.10 |
| | 100.00 | 100.00 |

Example 6

| | Parts | |
|---|---|---|
| Coolant liquid | 98.00 | 99.50 |
| Cobalt acetate | 0.90 | 0.25 |
| Zirconium acetate | 0.70 | 0.15 |
| Zinc permanganate | 0.40 | 0.10 |
| | 100.00 | 100.00 |

In general, the concentration of catalytic metal compounds in the coolant liquid may range from 0.50 to 2.0% by weight of the solution for optimum effectiveness, but higher or lower concentrations may be employed.

Catalytically effective surfaces within the combustion chamber may be created and maintained if the metered injection of internal coolant liquid contains a concentration of catalytic metal compounds equivalent to from 0.001 to 0.1% by weight of the metered operating fuel charge that is simultaneously introduced into the combustion chamber. In order for the proportion of catalytic metal compounds to be equivalent to from 0.001 to 0.1% by weight of the operating fuel charge, if the coolant contains between 0.5 and 2.0% of the catalytic metal compound by weight, the proportion of coolant liquid required to provide the specified range of concentration of catalytic metal compounds to operating fuel charge would be between 0.2 and 5% of coolant liquid by weight of the fuel charge simultaneously introduced into the combustion chamber.

If immediate or maximum catalytic effectiveness is desired as a result of the suspension of the metallic compounds within the burning fuel charge, the useful concentration of catalytic metal compounds contained in the metered injection of internal coolant liquids may be as high as 1% by weight of the operating fuel charge. Such a high ratio of catalytic metal compounds to fuel charge could not be achieved economically by dissolving the catalytic metal compounds directly in the fuel, but can be accomplished by a metered injection of a liquid solution of the metal compounds independently of any carbureted or manifolded induction system for the fuel itself.

Combinations of selected metal compounds produce unexpectedly improved results that are not attainable in full measure by the use of any of the compounds singly or in other combinations. For example, it has been discovered by actual tests in engine operations that if a chromium compound is made to constitute a substantial proportion of a catalytic composition, which also includes a cobalt compound, the efficiency of the chromium-cobalt catalytic composition is substantially higher than the efficiency of any other combination of metal compounds, or of compositions of metal compounds in which the chromium compound constitutes only about 1 to 2% by weight of the total composition. The improvement is evidenced not only by increased anti-knock value of the chromium-cobalt combination, but also appears in the enhanced efficiency of combustion of lean fuel-air mixtures. The chromium-containing catalyst, when present in substantial proportions, appears to activate to a maximum degree the anti-knock function of the cobalt-containing catalyst, and to provide an acceleration of the rate of combustion of lean fuel-air mixtures. This latter function has been established by the observation that with such a catalytic composition, the power output may be maintained without the excessive spark advances usually required for efficient combustion of lean fuel-air mixtures.

It has been found that the increase in efficiency of the combustion-improving catalytic compositions comprising compounds of chromium and cobalt is substantial if the chromium compound is present in an amount equal to at least 8% of the composition by weight, and reaches a maximum when the chromium compound represents about 50% of the composition by weight.

When the operating fuel used in the engine possesses sufficient anti-knock value to meet the octane requirements of the engine, and other phases of improved efficiency of combustion are the objective, particularly a more efficient combustion of lean fuel-air mixtures, it is preferred to include a cerium compound with the chromium-cobalt composition, or to substitute the cerium compound for the cobalt compound. It has been found that cerium compound when introduced into a combustion chamber of an engine accelerates the initiation of, and the rate of combustion of the fuel charge to a greater degree than do cobalt or chromium compounds. By including a substantial proportion of a cerium compound in such a composition, the ignition and completion of combustion of the cooler fuel particles present in the fuel layers adjacent to the relatively cool cylinder wall is facilitated. In such a catalytic composition, the cerium compound may be present within the range of 8 to 80% by weight of the composition, the chromium or cobalt compounds, or both, comprising the balance.

The compositions of chromium and cobalt; cerium, cobalt and chromium; cerium and cobalt; and cerium and chromium compounds may be introduced into an internal combustion engine either in solution in the liquid fuel for the engine or in solution or dispersion in the internal aqueous type coolant liquid, or in both. If the compositions are to be incorporated into the internal coolant liquid, compounds of cobalt, chromium and cerium are used that are soluble in the aqueous type internal coolant liquid employed and the solution then made up to concentrations of total added catalytic composition within the range of from 0.50 to 2.0% by weight of the solution. As examples of suitable soluble compounds may be mentioned cobaltous nitrate, chromium trioxide and cerous nitrate.

Thus, as an aqueous type internal coolant liquid, may be used a solution comprising a liquid vehicle selected from the group consisting of water, water soluble alcohols and water soluble glycols, and a soluble compound of a metal selected from the group consisting of cobalt, chromium and cerium and mixtures thereof.

The following are examples of liquid motor fuel compositions comprising solutions of compounds of cobalt, chromium, cerium and tetra-ethyl lead in various combinations, and embodying the relative concentrations providing the unexpectedly high catalytic activity herein described. As previously, the compositions are given in parts by weight:

Example 7

|  | Parts |  |
|---|---|---|
| Gasoline | 99.90 | 99.990 |
| Cobaltic acetylacetonate | 0.09 | 0.009 |
| Chromic acetylacetonate | 0.01 | 0.001 |
|  | 100.00 | 100.000 |

Example 8

|  | Parts |  |
|---|---|---|
| Gasoline | 99.90 | 99.990 |
| Cobalt methyl amino methylene acetone | 0.05 | 0.005 |
| Chromic propionylacetonate | 0.05 | 0.005 |
|  | 100.00 | 100.000 |

Example 9

|  | Parts |  |
|---|---|---|
| Gasoline | 99.990 | 99.9900 |
| Cobaltic acetylacetonate | 0.045 | 0.0045 |
| Chromic acetylacetonate | 0.045 | 0.0045 |
| Cerous acetylacetonate | 0.010 | 0.0010 |
|  | 100.000 | 100.0000 |

Example 10

|  | Parts |  |
|---|---|---|
| Gasoline | 99.90 | 99.990 |
| Chromic acetylacetonate | 0.02 | 0.002 |
| Cerous propionylacetonate | 0.08 | 0.008 |
|  | 100.00 | 100.000 |

Example 11

|  | Parts |  |
|---|---|---|
| Gasoline | 99.75 | 99.960 |
| Tetra ethyl lead | 0.15 | 0.030 |
| Cobaltic acetylacetonate | 0.08 | 0.008 |
| Chromic acetylacetonate | 0.02 | 0.002 |
|  | 100.00 | 100.000 |

Example 12

|  | Parts |  |
|---|---|---|
| Gasoline | 99.75 | 99.960 |
| Tetra ethyl lead | 0.15 | 0.030 |
| Cobalt methyl amino methylene acetone | 0.05 | 0.005 |
| Chromic propionylacetonate | 0.05 | 0.005 |
|  | 100.00 | 100.000 |

Example 13

|  | Parts |  |
|---|---|---|
| Gasoline | 99.750 | 99.9600 |
| Tetra ethyl lead | 0.150 | 0.0300 |
| Cobaltic acetylacetonate | 0.045 | 0.0045 |
| Chromic acetylacetonate | 0.045 | 0.0045 |
| Cerous propionylacetonate | 0.010 | 0.0010 |
|  | 100.000 | 100.0000 |

Compositions such as those given in Examples 11, 12 and 13, during combustion retain the antiknock values provided by the vapors of tetra ethyl lead and at the same time provide added octane or combustion-improving values above those provided by the tetra ethyl lead content. In addition, there have been found new and particular advantages to exist when the specified combinations of chromium, cobalt and cerium are introduced into the engine with tetra ethyl lead, using the fuel charge as the vehicle for their introduction. By contrast, for example, if instead of chromium, a substantial concentration of a nickel compound is combined with a cobalt or cerium compound, the full catalytic activity is reduced or nullified for the reason that vapors of tetra ethyl lead act as a poisoner of the nickle catalyst, whereas such vapors have no effect upon the activity of the chromium catalyst.

Another important advantage realized from the use of a substantial concentration of a chromium compound in combination with cobalt or cerium and tetra ethyl lead, is related to the known fact that the burning of tetra ethyl lead creates harmful deposits of lead oxide in the combustion chamber. In practice, it has been customary to incorporate tetra ethyl lead into the gasoline in the form of "ethyl fluid," a composition including tetra ethyl lead and halogen compounds, such as ethylene dichloride and ethylene dibromide, in an attempt to form residues consisting of non-fluxing lead compounds and thus avoid detrimental effects caused by lead oxide deposits in the combustion chamber. However, despite this practice, deposits of detrimental lead compounds remain in the combustion chamber to cause increase of octane requirements of the engine, damage to spark plugs and valves, and corrosion of valve seats. It is also known that residues in the form of halides resulting from the use of "ethyl fluid" contribute to the formation of sludge in the crank-case oil. These detrimental effects can be minimized or overcome if substantial concentrations of a chromium compound constitute a part of the catalytic compositions incorporated into motor fuels containing tetra ethyl lead and in that way introduced into the combustion chamber. This result may be attributable to the fact that lead chromates are formed in the combustion chamber to provide non-fluxing lead compounds.

From this standpoint, the chromium compound incorporated into a tetra ethyl lead fuel may be considered as an improved substitute for the customarily used halogen compound, thus providing a beneficial fuel-combustion catalyst and also eliminating the added expense and detrimental effects of the halogen compound. Lead chromate has a combustion accelerating catalytic effect, whereas lead oxide is known to have a decelerating effect upon the combustion of the hydrocarbon fuel and oily residues present in the combustion chamber.

As indicated in Examples 7 to 13, inclusive, where the catalytic metal compounds are to be incorporated in the liquid fuel itself, organometallic compounds are preferred, and particularly metallic beta diketone derivatives and their homologues, such as the metal acetylacetonates, propionylacetonates, formylacetonates, and the like. It is also feasible to use metal derivatives of beta diketone complexes, or of the condensation products of beta diketones with such organic compounds as the amines. In general, however, compounds of any of the foregoing metals and metalloids with the following organic acids or acid reacting compounds may be used:

Naphthenic and paraffinic acids.
Mono alkyl esters of salicylic, phthalic, camphoric, malonic and other dicarboxylic organic acids.
Cresylic acid and other phenols.
Mercaptans.
Aceto acetic acid esters and their homologues.
Long chain saturated and unsaturated fatty acids.
Aryl carboxylic acids.

As previously pointed out, however, it is usually advantageous to incorporate the catalytic metal compounds in the internal coolant liquid, which may be of the aqueous type, such as water, alcohol, water soluble glycols, or aqueous solutions of alcohols or water soluble glycols. In this way, any of the water soluble compounds of the metal, such as the acetates, nitrates, chlorides, sulfates, oxides, acids or acid anhydrides, may be used.

It will, of course, be understood that various details of the process may be varied through a wide range without departing from the principles of this invention and it is, therefore, not the purpose to limit the patent granted hereon otherwise than necessitated by the scope of the appended claims.

What is claimed is:

1. The method of creating and maintaining combustion-improving catalytic deposits in the combustion chamber of an internal combustion engine, which comprises introducing into the combustion chamber during operation of the engine an aqueous type internal coolant liquid containing a small but effective quantity of a dispersed compound of a catalytic metal.

2. The method as defined by claim 1, wherein the internal coolant liquid is water.

3. The method as defined by claim 1, wherein the catalytic metal is selected from the group consisting of cobalt, nickel, manganese, iron, copper, uranium, molybdenum, vanadium, zirconium, beryllium, platinum, palladium, thorium, chromium, aluminum, selenium, antimony, arsenic, bismuth, cadmium, tellurium, thallium, tin, barium, boron, cesium, potassium, sodium, tantalum, titanium, tungsten, zinc, cerium praseodymium, neodymium and lanthanum.

4. The method of improving combustion by creating and maintaining catalytic deposits in the combustion chamber of an internal combustion engine, which comprises introducing into the combustion chamber, simultaneously with a fuel charge, an aqueous type internal coolant containing not over about 2% by weight of a dissolved compound of a metal selected from the group consisting of cobalt, chromium, cerium, nickel, copper, manganese, iron, vanadium, aluminum, zirconium, zinc and boron.

5. The method of improving combustion by creating and maintaining catalytic deposits in the combustion chamber of an internal combustion engine, which comprises introducing with a metered fuel charge a concentration of a catalytic metal compound equivalent to from 0.001 to 1.0% by weight of said charge, said catalytic metal compound being introduced as a solution of not over about 2% by weight of a water soluble compound of a metal selected from the group consisting of cobalt, chromium, cerium, nickel, copper, manganese, iron, vanadium, aluminum, zirconium, zinc and boron.

6. The method of improving combustion by creating and maintaining catalytic deposits in the combustion chamber of an internal combustion engine, which comprises introducing into the combustion chamber during operation of the engine, a mixture of cobalt and chromium compounds in finely dispersed form and in the proportion of between 8 and 50% of chromium compound in said mixture.

7. The method of improving combustion by creating and maintaining catalytic deposits in the combustion chamber of an internal combustion engine, which comprises introducing into the combustion chamber during operation of the engine, a mixture of cobalt, chromium and cerium compounds in finely dispersed form and in the proportion of between 8 and 80% of cerium compound in said mixture.

8. The method of improving combustion by creating and maintaining catalytic deposits in the combustion chamber of an internal combustion engine, which comprises introducing into the combustion chamber during operation of the engine an aqueous type internal coolant liquid having dissolved therein a mixture of compounds selected from the group consisting of water soluble compounds of cobalt, chromium and cerium.

9. The method of improving combustion by creating and maintaining catalytic deposits in the combustion chamber of an internal combustion engine, which comprises introducing into the combustion chamber during operation of the engine an aqueous type internal coolant liquid having dissolved therein a mixture of compounds selected from the group consisting of water soluble compounds of cobalt, chromium and cerium, said mixture being present in an amount within the range of from 0.50 to 2.0% by weight of said solution.

10. An aqueous type internal coolant liquid for improving combustion in an internal combustion engine, comprising a liquid vehicle selected from the group consisting of water, water soluble alcohols, water soluble glycols, and mixtures thereof, and a catalyst dispersed in said liquid vehicle, said catalyst comprising a water soluble compound of a metal selected from the group consisting of cobalt, nickel, manganese, iron, copper, uranium, molybdenum, vanadium, zirconium, beryllium, platinum, palladium, thorium, chromium, aluminum, selenium, antimony, arsenic, bismuth, cadmium, tellurium, thallium, tin, barium, boron, cesium, potassium, sodium, tantalum, titanium, tungsten, zinc, cerium, praseodymium, neodymium and lanthanum.

11. An aqueous type internal coolant liquid for improving combustion in an internal combustion engine, comprising a liquid vehicle selected from the group consisting of water, water soluble alcohols, water soluble glycols, and mixtures thereof, and a catalyst dispersed in said liquid vehicle, said catalyst comprising a water soluble compound of a metal selected from the group consisting of cobalt, chromium, cerium, nickel, copper, manganese, iron, vanadium, aluminum, zirconium, zinc and boron.

JOHN T. DEMPSEY,
*Administrator of the Estate of Willard E. Lyons, Deceased.*

No references cited.